(12) United States Patent
Briggs

(10) Patent No.: US 6,275,353 B1
(45) Date of Patent: Aug. 14, 2001

(54) HOUSING FOR A DISC DRIVE HAVING CANTILEVERED BASE SLOT TO REDUCE MECHANICAL SHOCK DAMAGE

(75) Inventor: Christopher Horizon Walker Briggs, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/366,655

(22) Filed: Aug. 3, 1999

(51) Int. Cl.[7] .................................................. G11B 33/00
(52) U.S. Cl. ........................................................... 360/97.02
(58) Field of Search ............................. 360/97.01–98.01, 360/99.01; 361/684, 685

(56) References Cited

U.S. PATENT DOCUMENTS

| | | | |
|---|---|---|---|
| 5,305,180 | * | 4/1994 | Mitchell et al. ...................... 361/685 |
| 5,662,482 | * | 9/1997 | Shin ........................................ 439/64 |
| 5,717,575 | * | 2/1998 | Copeland et al. .................... 361/756 |
| 5,941,552 | * | 8/1999 | Beran ................................... 280/607 |
| 6,005,768 | * | 12/1999 | Jo ........................................ 361/685 |
| 6,078,498 | * | 6/2000 | Eckerd et al. ........................ 361/685 |

FOREIGN PATENT DOCUMENTS 8-7426 * 1/1996 (JP) .

* cited by examiner

Primary Examiner—Jefferson Evans
(74) Attorney, Agent, or Firm—Merchant & Gould; John R. Wahl

(57) ABSTRACT

A hard disc drive apparatus includes a head disc assembly mounted on a base plate and enclosed under a cup or hat shaped cover. The base plate has downwardly extending support rail portions extending along parallel side edges for mounting the apparatus in a computer drive bay. Each of the rail portions has an open longitudinal slot extending at least partially through the rail portions to absorb shock loads imparted to the apparatus when the drive is dropped prior to installation in the drive bay and thus minimize mechanical damage experienced by the HDA during the impact.

20 Claims, 3 Drawing Sheets

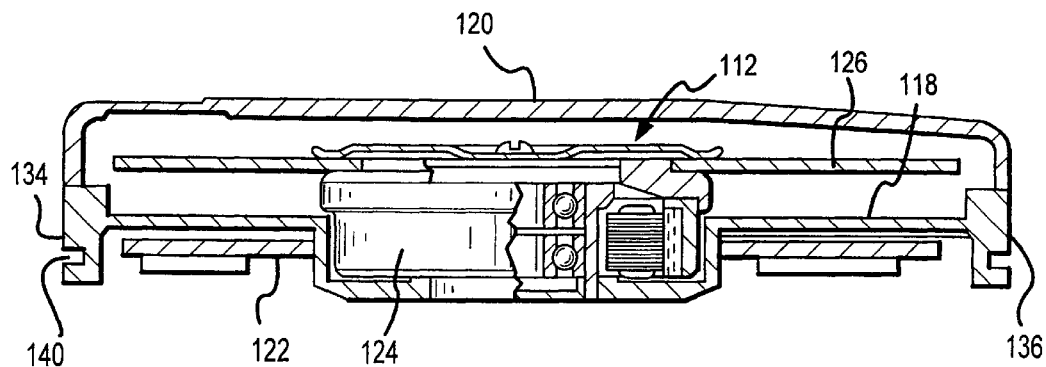
FIG.2
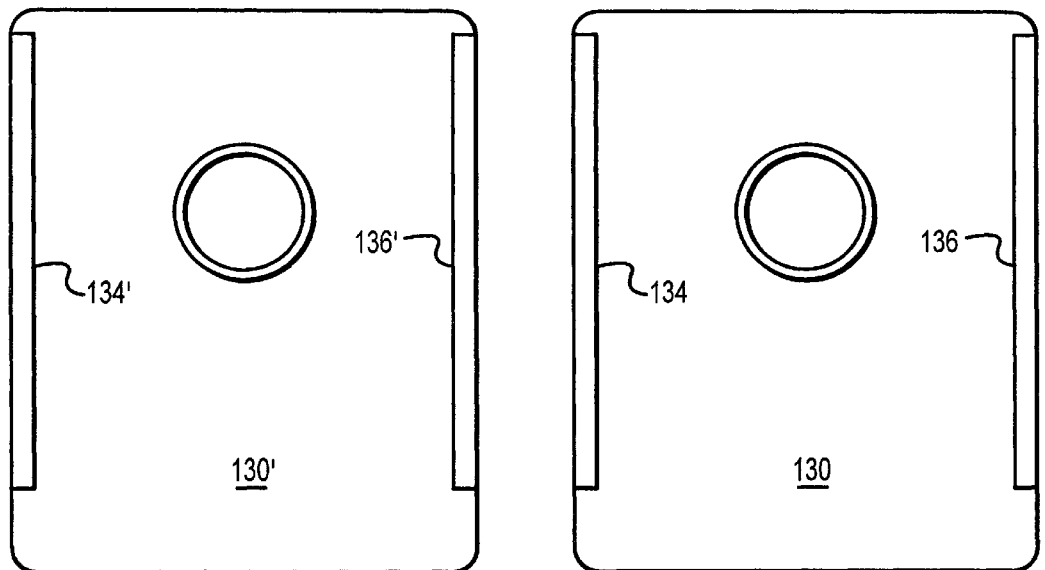
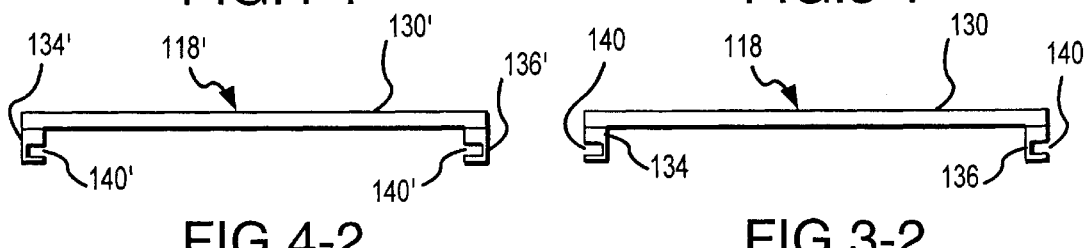
FIG.4-1  FIG.3-1
FIG.4-2  FIG.3-2

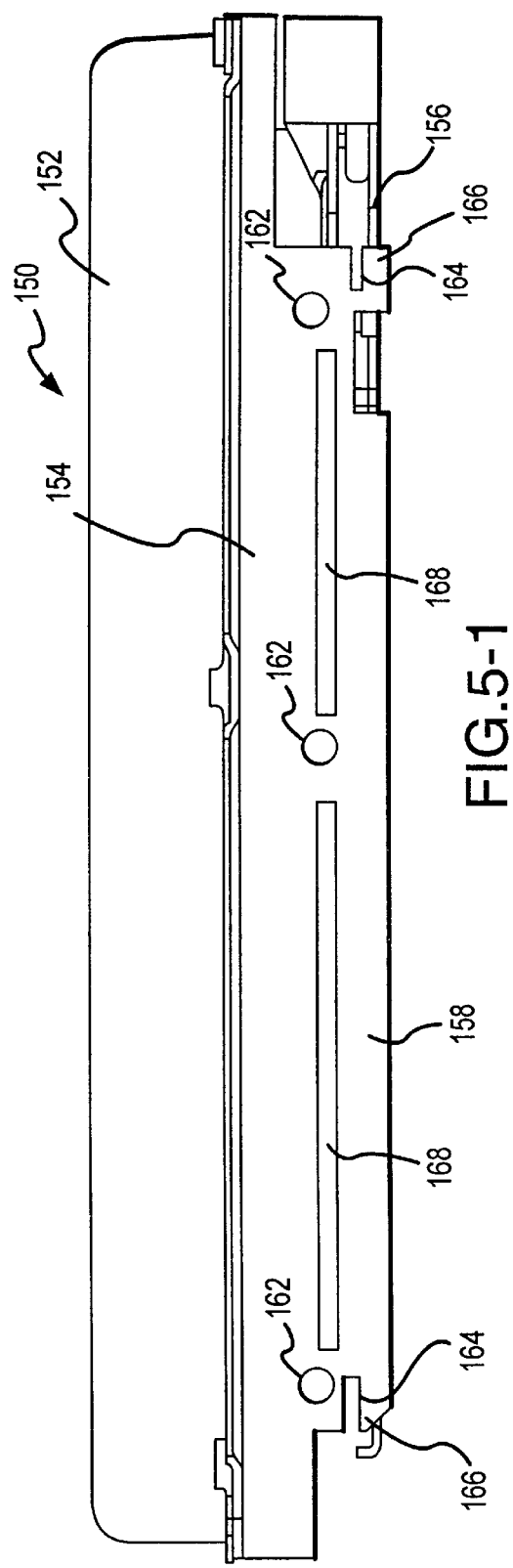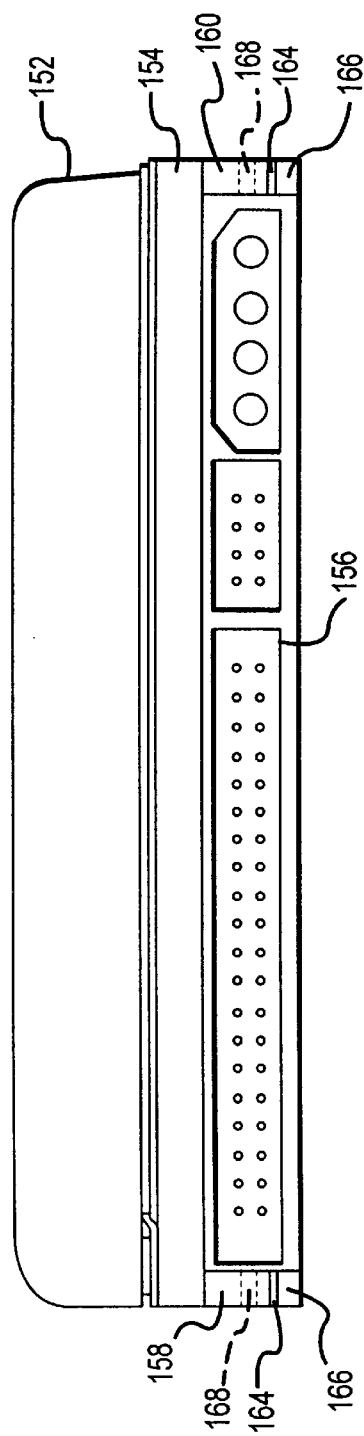

HOUSING FOR A DISC DRIVE HAVING CANTILEVERED BASE SLOT TO REDUCE MECHANICAL SHOCK DAMAGE

FIELD OF THE INVENTION

This application relates generally to magnetic data storage devices and more particularly to a hard disc drive apparatus having reduced susceptibility to mechanical shock damage.

BACKGROUND OF THE INVENTION

Disc storage devices are used in data processing systems for storing large amounts of information that can be accessed in milliseconds. Storage or retrieval of information is accomplished by a disc drive system which includes one or more read/write (R/W) heads or "sliders" to read/write data from/to one or more discs.

A disc drive system stores data on rotating media, for example a magnetic disc, and uses read/write heads suspended on a moving armature which read/write the data on the rotating media as the surface of the rotating media moves past them. The interface between the heads and the disc surface is extremely delicate.

It is known that all physical parts of the disc drive system posses resonant vibrational modes, where, if a frequency equal to the resonant mode frequency is applied to the system, the part will resonate and amplify the initial exciting frequency. The spindle/disc pack also possesses such modes. When the spindle/disc pack is excited, typically by externally generated shock loads, it can generate a large amount of movement of the disc surface relative to the read/write heads. This prevents the heads from reading/writing the correct tracks on the disc surface and may result in the disc drive controller inhibiting a write or read, known as a write protect/write unsafe or a read protect/read unsafe. When the duration of the disturbance is prolonged, a write or read fault is declared, i.e. the disc drive indicates that it cannot write or read the data, despite repeated attempts. As a result, a fatal condition occurs. When the disc drive is properly mounted in a computer console or case, such impact loads are usually minimized. However, when the drive is removed or handled prior to installation in the cabinet bay or case, the situation is different. Dropping the drive can severely damage the delicate disc/head interface.

When a mechanical shock load is experienced by a hard disc drive, for example, by the user hitting the drive or dropping the drive prior to or during handling while installing the drive in the computer case or laptop computer, the spin motor in the hard disc drive receives this shock and transmits the shock received by the housing to the discs. If the frequency of the shock coincides with a resonance characteristic of the housing and/or the HDA, the transmitted shock load may be substantial. Since each of the sliders rests on the surface of one of the discs, the shock induced vibrations may cause surface to slider contact with potentially detrimental damage to the discs and/or sliders. Consequently, it is desirable to minimize the effects of external shock loads on the drive when the drive is not installed in the computer case or rack. One solution is to provide a rubber gasket between the base of the disc drive housing and the spin motor support in the disc drive housing, which dampens transmission of shock loads. However, this solution has the drawback of requiring additional assembly parts and therefore adds an additional cost to the apparatus.

Another problem that arises is one associated with the return of allegedly defective drives to the manufacturer. Sometimes a user/purchaser may drop a drive on the ground, then install the drive, and then find out that the drive no longer reads or writes data properly. The user then typically returns the drive to the dealer or manufacturer for a replacement drive. There is presently no built in mechanism in disc drives to accurately determine whether the drive has been subjected to unacceptably high shock loads during handling.

The present invention provides solutions to the above and other problems and offers advantages over the prior solutions to the above and other problems. These and various other features as well as advantages which characterize the present invention will be apparent upon reading of the following detailed description and review of the associated drawings.

SUMMARY OF THE INVENTION

The disc drive apparatus in accordance with the present invention incorporates a means for dampening shock loads to the disc drive housing by providing in the base plate structure of the housing itself a dampening means thus reducing the shock loads seen internally by the spin motor and thus reducing the shock loads to the disc/head interface. This may be done with or without providing a separate vibration damping spin motor mounting gasket between the base plate and the spin motor itself.

The disc drive in accordance with the present invention includes a base plate for supporting the head disc assembly (HDA) thereon and a cover fastenable to the base plate for enclosing the HDA on the base plate. A first embodiment of the invention has a cantilevered rail member formed in the base plate preferably on either side of the spin motor and preferably extending along the longer side edges of the base plate. Typically, these rails are used to mount the drive in a drive bay in a computer case via screws placed in appropriately spaced holes in the rails. These cantilevered rail members are formed by providing a horizontally open slot in each rail extending longitudinally either in the outer face or the inner face of the rail.

A second embodiment of the disc drive in accordance with the invention includes a base plate having a longitudinal side rail extending downward from each side of the rectangular base plate along each long edge of the rectangular base plate and at least one through slot extending longitudinally through the side rail. Since the disc drive is typically mounted into a computer case via screws in screw holes through the side rails, the longitudinal through slot is preferably spaced between the screw holes.

In another embodiment of the present invention, an open longitudinal slot may be cut through each of the ends of the side rails so as to form a thin tongue of rail at each rail end. If the drive is dropped onto a hard surface, for example, the drive typically will not land squarely on its top, bottom, or side. Instead, one of the corners will strike the hard surface first. Since, in this embodiment, a thin tongue of rail exists at each end of the rail and thus at each corner of the base plate, it will likely strike the hard surface and deform or break. This serves two purposes. First, the tongue deformation or breakage absorbs at least part of the impact load. Second, the deformation can be detected upon return of the "defective" drive as evidence of the drive having been subjected to an excessive load. The location, length, and thickness of the rail tongue or finger can be selected such that an acceptable shock load will not deform the tongue, but an excessive load will. Thus the second purpose is to provide an indicator of excessive shock loading.

These and various other features as well as advantages which characterize the present invention will be apparent from a reading of the following detailed description and a review of the associated drawings.

BRIEF DESCRIPTION OF THE DRAWINGS

FIG. 2 is a cross sectional view of the hard disc drive assembly shown in FIG. 1 taken along the line 2—2 in FIG. 1.

FIG. 3-1 is a separate simplified plan bottom view of the base plate of the first embodiment of the invention shown in FIGS. 1 and 2.

FIG. 3-2 is an end view of the base plate shown in FIG. 3-1.

FIG. 4-1 is a simplified plan bottom view of a second embodiment of the base plate of the invention.

FIG. 4-2 is an end view of the base plate shown in FIG. 4-1.

FIG. 5-1 is a side view of another hard disc drive assembly incorporating a third embodiment of the invention.

FIG. 5-2 is a connector end view of the hard disc drive assembly shown in FIG. 5-1.

DETAILED DESCRIPTION

Figure 1:
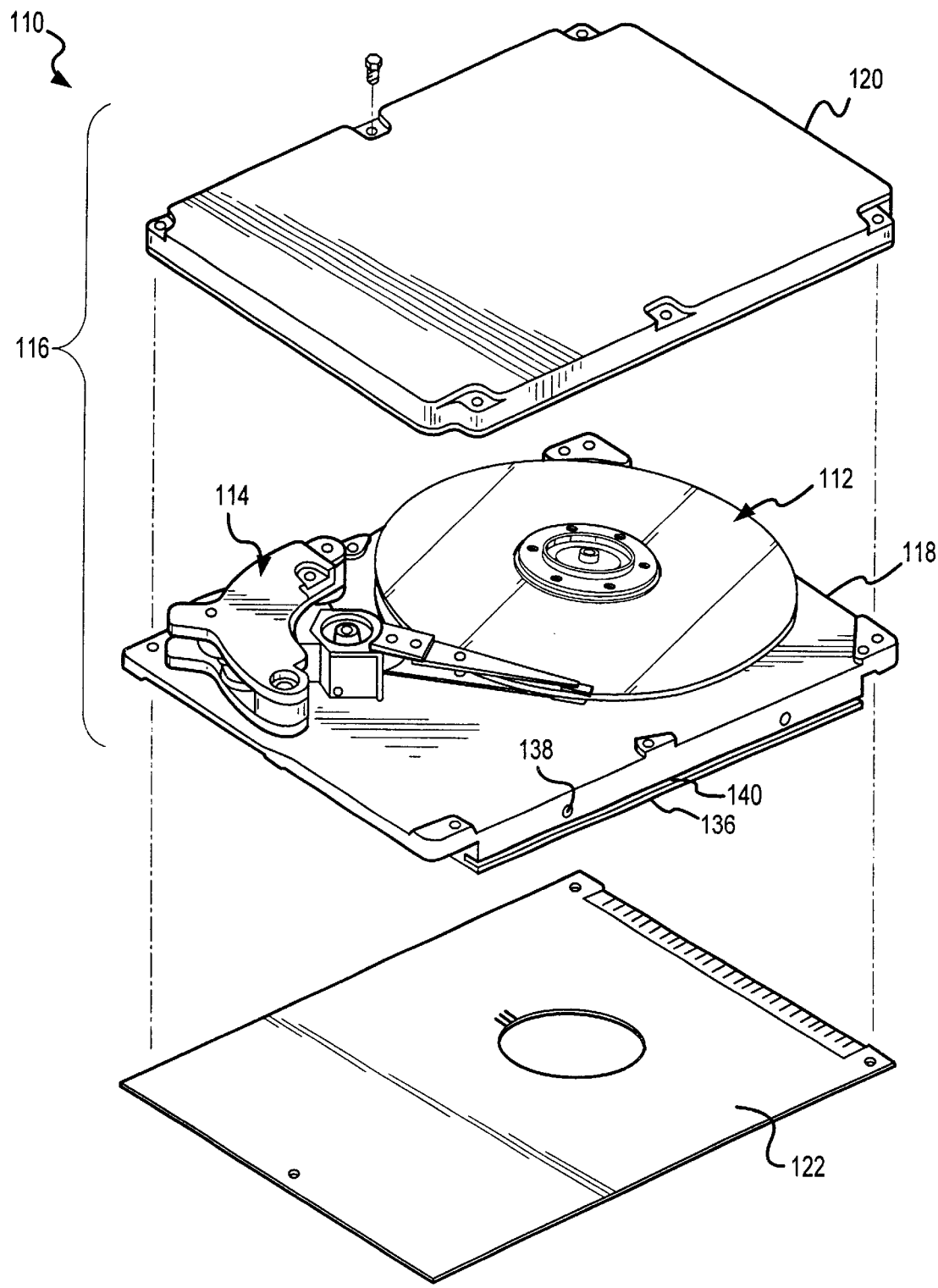
FIG. 1 is an exploded perspective view of a typical hard disc drive assembly incorporating a base plate in accordance with a first embodiment of the present invention.

A perspective exploded view of a hard disc drive apparatus 110 in accordance with the present invention is shown in FIG. 1. Disc drive apparatus 110 includes a head disc assembly 112 and an actuator assembly 114 enclosed in a dust free, hermetically sealed housing 116. This housing 116 includes a base plate 118 and a cup or hat shaped upper case 120. The base plate 118 is secured to the upper case 120 with a plurality of screws which compress a gasket between the base plate and an outer flange of the upper case 120. A printed circuit board 122 is fastened to the underside of the base plate 118. This circuit board 122 typically contains the drive control electronics circuitry and interface components for interfacing the drive apparatus 110 with other computer elements.

A cross sectional view of the assembled hard disc drive apparatus 110, taken on a line 2-2 through the spindle motor 124, is shown in FIG. 2. The spin motor 124 supports and drives one or more hard discs 126. The spin motor 124 is in turn supported by the base plate 118 and may be fastened thereto by any conventional means such as screws or press fit into a recess 128 in the base plate 118.

The base plate 118 has a generally rectangular plate portion 130 and a peripheral thickened edge portion 132 surrounding the plate portion 130 for receiving a peripheral gasket and the lower perimeter edge of the cover 120 as is shown in FIG. 2. The plate 118 also has a pair of longitudinal side wall rail portions 134 and 136 extending downward from the longer side edges of the plate portion 130 which provide structural stiffness to the base plate 118 and provide a location for mounting holes 138 to mount the drive in a computer case or bay. Each of the rail portions 134 and 136 has an outwardly open longitudinal channel or slot 140 which extends preferably the full length of the rail portion. This slot 140 forms a cantilevered rail extending along the bottom length of the side wall rail portion 134, 136. It has been found that the cantilevered rail provides a significant amount of damping to the fundamental mode of shock load transmitted from the rails to the base plate portion 130, and hence, to the spin motor 124 and the HDA in general when the assembled drive is dropped or subjected to an impact load. Empirically, it has been found that the cantilevered rail base plate configuration effectively reduces the transmission of side shock loads by 25–35%, depending on the location, depth and width of the slot 140 in the rail portions 134 and 136. Results of one exemplary set of tests is shown in the Table below.

Column A represents a nominal drive with no slots 140 in rails 134 and 136. Column B represents a base plate configuration having a 17 millimeters deep 2 millimeters wide horizontal slot cut into each end of the rails 2 millimeters from the bottom surface of each rail (similar to the slot 164 shown in FIG. 5). Column C represents a configuration having a 2 millimeters wide 17 millimeters deep horizontal slot cut into each end of the rails 1 millimeters from the bottom surface of each rail (similar to the slot 164 shown in FIG. 5). Column D represents a 4 millimeters deep slot 2 millimeters wide cut along the outside of each rail 134 and 136 1 millimeter from the bottom surface of the rail (similar to the slot 140). Column E represents a 4 millimeters deep slot 2 millimeters wide cut along the outside of each rail 134 and 136 as in Column D, but with an additional 4 millimeters deep slot 2 millimeters wide cut along the inside of each rail 134 and 136 4 millimeters from the bottom surface of the rail (combination of slots in FIG. 3 and FIG. 4).

TABLE

| Base Description | A Nominal | B Thick end | C Thin end | D Out Low | E In High |
|---|---|---|---|---|---|
| Corner | 186 Gs | 18.5 Gs | 9 Gs | 48 Gs | 48 Gs |
| % improve | 0% | 90% | 95% | 74% | 74% |
| Drop | 519 Gs | 398 Gs | 491 Gs | 343 Gs | 363 Gs |
| % improve | 0% | 23% | 5% | 34% | 30% |

In the above Table, column A, it can be seen that drop of a nominal disc drive assembly 1.2 centimeters onto a table produces a deceleration shock load of 519 G's to the head/disc interface for a drive not having the longitudinal slots 140 in the rails 134 and 136. In contrast, looking at column D, for the same drive having longitudinal slots as shown in FIG. 3-1 and 3-2, the deceleration shock loads experienced is 343 g's, an improvement of 34%. Thus the cantilevered rails absorb a substantial amount of shock load, minimizing the amount of shock load transmittable to the head/disc interface.

Referring now to FIGS. 4-1 and 4-2, a second embodiment 118' of the base plate of the invention is shown. In this embodiment, the base plate 118' has a generally rectangular flat portion 130' and two downwardly extending rail portions 134' and 136' along the longitudinal edges of the rectangular portion 130'. Each of the rail portions 134' and 136' has an inwardly open longitudinally extending slot 140' formed in the inside walls of the rail portions. Although experimental tests on this configuration have not been performed, it is expected that shock load performance of this embodiment will be similar or better than that shown above with reference to the first embodiment. Columns B and C illustrate that a substantial improvement in shock loading occurs for corner drop impacts of the hard disc drive when an open slot is formed in each end of the rail portions 134 and 136.

A third embodiment of the present invention can be seen with reference to the side and end views of a hard disc drive assembly 150 shown in FIGS. 5-1 and 5-2 respectively. In this configuration, the disc drive 150 comprises a cover 152, a HDA (not visible), a base plate 154 and a circuit board/ connector assembly 156 fastened to the base plate 154. The base plate 154 is a generally flat rectangular plate having downwardly extending parallel side rail portions 158 and 160 extending longitudinally along the outer side edges of the base plate 154. The base plate 154 has three threaded holes 162 spaced along the rail portions 158 and 160. These holes 162 receive screws (not shown) which secure the drive 150 in a conventional drive bay in a computer case.

Each of the rail portions 158 and 160 has an open horizontal slot 164 extending from the ends of the rail portion, forming a cantilevered "diving board" 166 at each corner. This diving board 66 is designed to deflect when the drive 150 is dropped prior to installation in a computer case and provide an indication of excessive impact forces being applied to the drive. Since the generally rectangular box shape, if it is dropped on a desk, floor or other hard surface, the probability of it landing squarely on one surface is small. It is much more likely that the drive will land on a corner. The diving boards 166 formed at each end of the rail portions 158 and 160 are sized and positioned to provide a "go-no-go" indicator mechanism of excessive impact forces having been applied to the drive 150. If the impact force is acceptable, no deformation of the diving board will be exhibited. If the impact force exceeds allowable limits, the diving board 166 at the point of impact will bend plastically to the adjacent rail portion. When such a drive is returned as faulty, the deformation can readily be seen and excessive impacts recognized. Referring back to the Table, Columns B and C show that the corner impact load absorbed by the diving boards is substantial, with about 90% of the load being absorbed and not transmitted to the HDA.

The impact force required to plastically deform the diving board 166 may be determined experimentally from varying the location, depth and width of the slot 164. The deeper the slot, the less force required, and the thinner the diving board 166 (i.e. closer the slot is to the bottom of the rail 158 as shown in FIG. 5-1) the less force required for plastic deformation.

An alternative to the outwardly open or inwardly open slots 140 and 140' shown in FIGS. 1-4 is also shown incorporated into the drive 150 shown in FIG. 5-1 and 5-2. Each of the rail portions 158 and 160 has longitudinally extending through slots 168 extending laterally completely through the rail portions 158 and 160 between the screw holes 162. These through slots should absorb side impact loads similarly to that shown in the table above for the outwardly open and inwardly open slot configurations tested. The slots 168 may be utilized separately or in conjunction with the cantilevered diving board ends. Also, the diving boards 166 may be incorporated into the designs shown in FIGS. 1-4 which utilize an open slot rather than a through slot design.

A base plate in accordance with the present invention (such as 118) for a hard disc drive assembly (such as 110) preferably has a generally rectangular plate portion (such as 130) adapted to support a head disc assembly (such as 112) thereon, the plate portion (such as 130) having a pair of parallel longitudinal side edges (such as edge portion 132), and a pair of rail portions such as 134, 136) each extending downward from one of the side edges, wherein each of the rail portions (such as 134, 136) has a longitudinally extending horizontally open slot (such as 140) formed therein. The base plate (such as 118) may have each of the slots (such as 140) opening outwardly from the rail portions (such as 134, 136). Alternatively the base plate (such as 118') may have each of the slots (such as 140') opening inwardly toward the slot in the other rail portion (such as 134', 136'). The base plate (such as 154) may also alternatively have each of the slots (such as 168) extending horizontally through the rail portion (such as 158, 160).

Similarly, the base plate (such as 154) according to the invention may have each of the slots (such as 164) extending through the rail portion (such as 158, 160) and extending longitudinally from one end of the rail portion (such as 158) thereby forming a cantilever supported member (such as 166) at the end. The base plate (such 118) may also include each rail portion (such as 134, 136) having a pair of opposite ends and a slot (such as 164) extending longitudinally from each end forming a cantilever supported member at each end.

The base plate (such as 154) in accordance with the invention may have each rail portion (such as 158, 160) having a pair of ends and each of the slots (such as 168) extending completely through the rail portion (such as 158, 160) intermediate the ends.

A hard disc drive apparatus in accordance with the present invention (such as 110) may have a head disc assembly (such as 112) enclosed by a generally rectangular base plate (such as 118) and a generally hat shaped cover member (Such as 120), wherein the base plate has a pair of parallel rail portions (such as 134, 136 or 158, 160) extending from opposite side edges of the plate and each of the rail portions has a longitudinally extending open slot (such as 140, 140' or 168) therein. The apparatus (such as 110) may also have each of the slots (such as 140) opening outwardly from the rail portions. Alternatively, the apparatus may have each of the slots (such as 140') opening inwardly toward the slot in the other rail portion. Further, the base plate (such as 118 or 154) according to the invention may have each of the slots (such as 168 or 164 extending laterally completely through the rail portion (such as 158, 160). In addition, the base plate (such as 154) may have each of the slots (such as 164) extending laterally through the rail portion (such as 158, 160) and extending longitudinally from one end of the rail portion thereby forming a cantilever supported member (such as 166) at the end.

The base plate (such as 154) may further include each rail portion (such as 158, 160) having a pair of opposite ends and a slot (such as 164) extending longitudinally from each end forming a cantilever supported member (such as 166) at each end. The base plate may further or alternatively have each rail portion having a pair of ends (such as 166) and each of the slots (such as 168) extending completely through the rail portion (such as 158, 160) intermediate the ends.

A hard disc drive apparatus (such as 110 or 150) in accordance with the invention may also be characterized as having a base plate (such as 118 or 154), a head disc assembly (such as 112) operably mounted on the base plate (such as 118 or 154), a cover (such as 120 or 152) over the head disc assembly and fastened to the base plate, wherein the base plate (such as 118 or 154) has a pair of rail portions (such as 134, 136 or 158, 160) extending away from the cover (such as 120 or 152), each of the rail portions including means (such as 140, 140', 168 or 164) therein for absorbing an impact load applied against one of the rail portions.

The apparatus in accordance with the invention may also include each of the rail portions (such as 134, 136 or 158, 160) having at least one longitudinally extending slot (such as 140, 140', 168, or 166) therein. Further, the slot (such as 168) may extend laterally through the rail portion. Alternatively, each of the rail portions may have opposite ends and a longitudinally extending slot (such as 164) through at least one of the ends. Further, each end may have a longitudinally extending slot (such as 164) therein. Further, each of the rail portions (such as 158, 160) may have at least one open slot (such as 168) intermediate of the ends.

It will be clear that the present invention is well adapted to attain the ends and advantages mentioned as well as those inherent therein. While a presently preferred embodiment has been described for purposes of this disclosure, numerous changes may be made. For example, there may be a number of longitudinally extending short through slots (similar to 168) in the rails which may be spaced along the rails to present a honeycomb appearance along the rail portion. The open slots may be alternating in position at different distances from the plane of the base plate so as to present an overlapping brick pattern. Other changes will also readily suggest themselves to those skilled in the art and which are encompassed in the spirit of the invention disclosed and as defined in the appended claims.

What is claimed is:

1. A base plate for a hard disc drive assembly comprising:

a generally rectangular plate portion having a disc drive motor support thereon, the plate portion having a pair of parallel longitudinal side edges, and a pair of rail portions each extending downward from one of the side edges, wherein each of the rail portions has a longitudinally extending horizontally open slot formed therein, said slot acting to absorb external impact loads.

2. The base plate according to claim 1 wherein each of the slots opens outwardly from the rail portions.

3. The base plate according to claim 1 wherein each of the slots opens inwardly toward the slot in the other rail portion.

4. The base plate according to claim 1 wherein each of the slots extends laterally through the rail portion.

5. The base plate according to claim 1 wherein each rail portion has a pair of ends and each of the slots extends completely through the rail portion intermediate the end.

6. A base plate for a hard disc drive assembly comprising:

a generally rectangular plate portion adapted to support a head disc assembly thereon, the plate portion having a pair of parallel longitudinal side edges, and a pair of rail portions each extending downward from one of the side edges, wherein each of the rail portions has a longitudinally extending horizontally open slot formed therein wherein each of the slots extends laterally through the rail portion and extends longitudinally from an end of the rail portion thereby forming a cantilever supported member at the end and acts to absorb external impact loads.

7. The base plate according to claim 6 further comprising each rail portion having a pair of opposite ends and a slot extending longitudinally from each end forming a cantilever supported member at each end.

8. A hard disc drive apparatus comprising a head disc assembly enclosed by a generally rectangular base plate and a generally hat shaped cover member, wherein the base plate has a pair of parallel rail portions extending from opposite side edges of the plate and each of the rail portions has a longitudinally extending open slot therein, said slot acting to absorb external impact loads.

9. The apparatus according to claim 8 wherein each of the slots opens outwardly from the rail portions.

10. The apparatus according to claim 8 herein each of the slots opens inwardly toward the slot in the other rail portion.

11. The base plate according to claim 8 wherein each of the slots extends laterally through the rail portion.

12. The base plate according to claim 8 wherein each of the slots extends through the rail portion and extends longitudinally from one end of the rail portion thereby forming a cantilever supported member at the end.

13. The base plate according to claim 12 further comprising each rail portion having a pair of opposite ends and a slot extending longitudinally from each end forming a cantilever supported member at each end.

14. The base plate according to claim 8 wherein each rail portion has a pair of ends and each of the slots extends completely through the rail portion intermediate the ends.

15. A hard disc drive apparatus having a base plate, a head disc assembly operably mounted on the base plate, and a cover over the head disc assembly enclosing the head disc assembly between the base plate and the cover, the apparatus comprising:

a pair of spaced parallel elongated rail portions extending from the base plate away from the cover; and means in the rail portions for absorbing an external impact load applied to the base plate.

16. The apparatus according to claim 15 wherein the means includes each of the rail portions having at least one longitudinally extending slot therein.

17. The apparatus according to claim 16 wherein the slot extends through the rail portion.

18. The apparatus according to claim 17 wherein each of the rail portions has opposite ends and a longitudinally extending slot through at least one of the ends.

19. The apparatus according to claim 18 further comprising each end having a longitudinally extending slot therein.

20. The apparatus according to claim 19 further comprising each of the rail portions having at least one open slot intermediate of the ends.

* * * * *